United States Patent [19]

Shaw et al.

[11] Patent Number: 5,108,283
[45] Date of Patent: Apr. 28, 1992

[54] APPARATUS FOR WINDING PIPES

[75] Inventors: Keith J. Shaw, Pfäffikon; André Caluori, Domat-Ems; Hansjörg Heer, Tuggen, all of Switzerland

[73] Assignee: Ametex AG, Switzerland

[21] Appl. No.: 461,524

[22] Filed: Jan. 5, 1990

[30] Foreign Application Priority Data

Jan. 5, 1989 [CH] Switzerland .............................. 33/89

[51] Int. Cl.$^5$ .............................................. B29C 53/72
[52] U.S. Cl. ................................. 425/391; 29/890.053; 72/49; 156/195; 156/425; 242/7.21; 425/457
[58] Field of Search .......................... 242/7.21-7.23; 72/49, 50; 29/890.053; 264/103; 425/111, 122, 427, 457, DIG. 7; 156/195, 425

[56] References Cited

U.S. PATENT DOCUMENTS 4,867,671 9/1989 Nagayoshi et al. ................. 425/391

FOREIGN PATENT DOCUMENTS 0956752 4/1964 United Kingdom ............... 242/7.22

Primary Examiner—Daniel P. Stodola
Assistant Examiner—William G. Battista, Jr.
Attorney, Agent, or Firm—Laurence R. Brown

[57] ABSTRACT

The pipe winding apparatus includes a stationary cage formed by rods between two rings. The speciality is that at least a number of the cage rods is located oblique between the rings by the pitch of the strip to be wound helically and is driven such that the strip to be wound can be fed at a right angle against the driven rods. This allows an optimal utilization of the frictional forces between the strip and the rods and to wind the pipe by the drive of the rods and to advance the pipe produced thereby.

13 Claims, 2 Drawing Sheets

APPARATUS FOR WINDING PIPES

BACKGROUND OF THE INVENTION

1. Field of the Invention

The present invention relates to an apparatus for the production of pipes by a helical winding of a strip of plastic material and including a stationary winding cage formed of a plurality of rod shaped members arranged between two parallel annular supporting disks and forming the cylindrical cage, of which rods at least a number is driven to rotate around their respective longitudinal axis in order to support a strip guided by a guiding unit onto the inner side of the cage to the desired diameter and to feed the strip in the direction of the winding and to join the meeting edges of the strip together.

2. Description of the Prior Art

A winding apparatus of the kind described above by means of which plastic strips or profiles are wound helically to stable relatively rigid pipes in situ e.g. in a shaft, and are simultaneously, i.e. during the process of the production of so called renovation pipes driven forwards into existing pipe conduits in need of repair have been known by applicant.

Although a number of the cage forming rods or rollers of this known apparatus already are driven in the strip feeding direction in order to thereby support the winding and feeding operation of the pipe, this solution is not fully satisfactory. At the one hand the known apparatus comprises an intrinsic guiding and driving mechanism which occupies a lot of space and at the other hand the frictional forces between the driven cage rods and the strip are utilized to a minor extent only.

SUMMARY OF THE INVENTION

It is, accordingly, a general object of the present invention to provide an improved winding apparatus in which the frictional forces between the driven cage rods and the strip to be wound are utilized to a maximal extent such that as a rule one may renounce to the installation of an additional strip feeding apparatus.

A further object of the invention is to provide a winding apparatus in which the driven cage rods are located obliquely between the annular supporting disks, in accordance with the pitch angle of the strip to be wound helically, and in which a means for placing the strip to be wound perpendicularly to the longitudinal axis of the driven cage is provided.

Due to the inventive arrangement of the driven cage rods the forces prevailing between rods and the strip laying on the rods are utilized fully or optimally to thereby, on the one hand advance the strip and on the other hand to join the meeting edges of the strip together and to drive forward the thus produced pipe into a through-passage located ahead of the exit of the apparatus by a rotating thereof around the longitudinal axis.

Due to the fact that the driven cage rods are located obliquely by the angle of the pitch of the strip being wound, the driven rods contact the strip being fed over the entire width of the strip which is fed perpendicularly thereto and thereby the forces are built up which are necessary for the feeding of the strip, this by utilizing the frictional forces existing between the rods and the strip.

As a rule, an additional feeding mechanism for the strip is not needed, although such a mechanism may be foreseen for overcoming frictional forces in the strip feeding unit, when e.g. reeling the strip off.

Yet a further object is to provide a winding apparatus in which a guiding unit is arranged to feed the strip tangentially onto an inner side of the cage and perpendicularly to the longitudinal axis of the obliquely mounted cage rods which unit is mounted to the stand or frame of the apparatus such to be pivotable by an adjustable angle.

A further object is to provide a winding apparatus having a strip joining roller projecting into the inner space of the cage and which places itself from the inner side at the strip edge joining zone against the trip in order to join the meeting strip edges together (generally a groove and key coupling), if necessary by making use of an additional counter supporting roller (which can be formed by one of the rods of the cage).

The length of the cage amounts generally to several times the width of the strip such that an optimal calibrating of the pipe is guaranteed at all operating conditions.

Due to this length of the cage it might be specifically advantageous to provide driven cage rods which present in the longitudinal section a concave rather than a cylindrical shape. By this measure the deviation of the envelope (in case of rods extending parallel to the axis of the cage) due to the oblique placement of the driven cage rods is corrected. For general applications, however, cylindric cage rods may do and ensure the optimal transfer of the frictional and driving forces respectively.

The rods of the cage are generally made of steel. The surfaces of the rods may thereby be smooth or roughened (having ribs), or may possibly have a covering of a plastic material (e.g. elastomers).

Due to the oblique positioning of the driven cage rods an optimal winding of the pipes as well as their feeding is arrived at. However, the inventive design calls for a certain expenditure regarding the drive of the cage rods (connecting joint between the normal drive shafts and the oblique rods or individual fluid motors) as well as their supports. Tests have, however, proven that this expenditure pays off.

BRIEF DESCRIPTION OF THE DRAWINGS

The invention will be better understood and objects other than those set forth above, will become apparent when consideration is given to the following detailed description thereof. Such description makes reference to the annexed drawings wherein.

DETAILED DESCRIPTION OF PREFERRED EMBODIMENT

Figure 1:
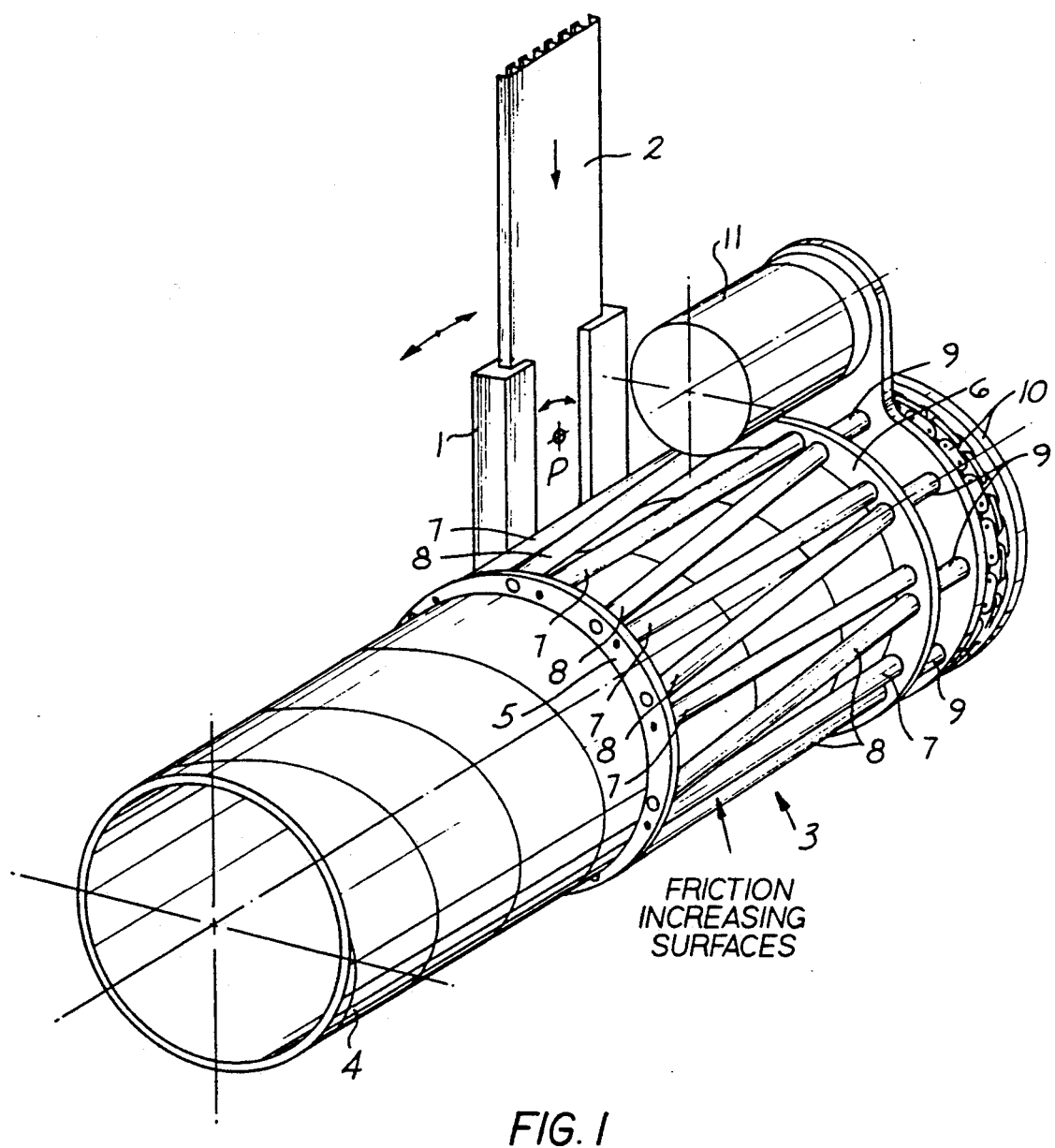
FIG. 1 is a schematic perspective view of an embodiment of the invention.

FIG. 1 of the drawings illustrates on a schematic basis only the basic structure of an inventive winding apparatus. The apparatus comprises a guiding unit 1 located in a not particularly illustrated assembly stand through which unit 1 a plastic strip or profile 2 is fed at an adjustable angle tangentially into the winding cage 3 proper. The unit 1 is mounted to the stand or frame and arranged thereat pivotable by the desired angle. The angle to be set corresponds to the pitch of the profile 2 to be wound helically which pitch in turn depends from the width of the profile and the diameter of the pipe to be produced.

Accordingly, the illustrated apparatus allows a profile having a predetermined width to be wound to a pipe having a predetermined diameter. If the width of the profile is changed the guiding unit 1 must be replaced by a unit having a suitable width and the setting of the angle of the unit 1 relative to the longitudinal axis of the cage 3 must be adjusted anew. For other diameters of pipes the entire cage 3 is to be replaced by a cage having the desired diameter and the guide unit 1 is then to be adjusted accordingly.

The winding cage 3 includes a base frame of two parallel annular supporting disks 5 and 6 which are kept at a distance from each other by fixed rods 7. The rods 7 ensure a sufficient rigidity of the stationary cage 3 which, moreover, is mounted to a not particularly illustrated stand or frame.

Between every two fixed cage rods 7 a rod 8 is inserted arranged obliquely by the angle of the pitch of the profile 2 to be wound helically, which rods 8 are located rotatably drivable between the rings 5 and 6. The rods 8 are supported in the two rings 5,6 in special oblique bearings and are driven by drive shafts 9 and intermediate shaft journals (not specifically illustrated).

The driving mechanism 10 (chain drive) is mounted at the reverse part of the cage 3 and includes e.g. a chain drive which in turn is driven by a suitable fluid motor 11.

The driven cage rods 8 are supported at their ends in the rings 5,6 at a same diameter relative to the axis of the cage. Their oblique position is set, for a given cage diameter (pipe diameter), to a predetermined profile width such that after one revolution of the strip, the joining of two meeting profile edges is accomplished (the edges of the profile are designed in accordance with the common procedure, i.e. they allow a joining together by a groove and tongue arrangement).

Figure 2:
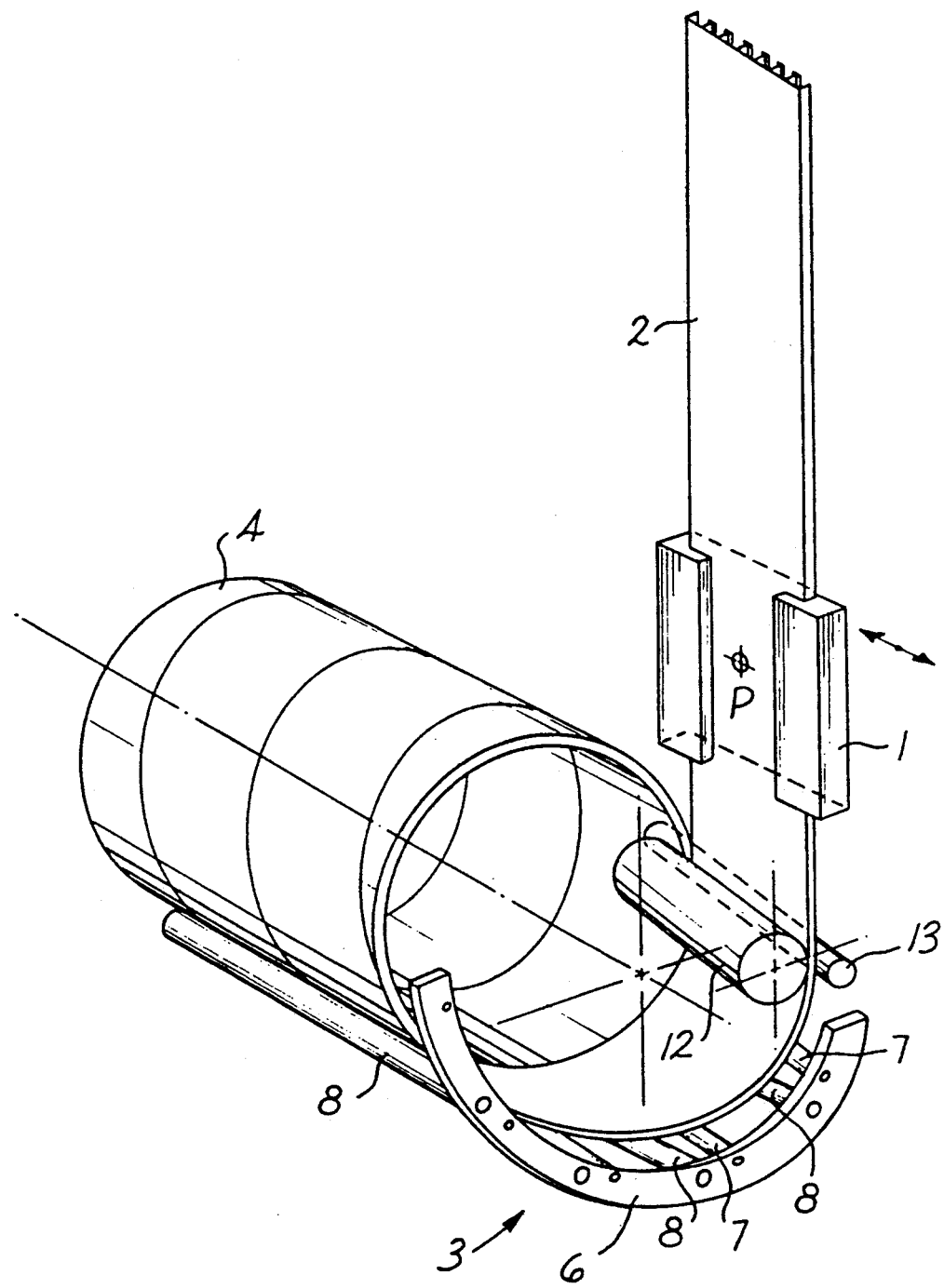
FIG. 2 shows a further perspective view of parts of the apparatus according to FIG. 1 (the other parts have been omitted for reason of a better overall view).

In order to facilitate the joining together preferably a strip joining roller 12 is provided which projects from the rearward end into the cage 3 such as illustrated in FIG. 2. The roller 12 projects by such a distance into the cage 3 that it comes to contact the strip at the zone of the joining of the edges from within the cage 3 and joins the strip to the edge of the fed profile. A counter supporting roller 13 is preferably located at the outer side behind the roller 12 such as is illustrated in the Figure. This counter supporting roller 13 should be designed rotatably. It can e.g. be formed by one of the oblique cage rods 8 or can consist of an additional roller mounted e.g. to the guiding unit 1 forming a roller pair having therebetween a clamping gap. Preferably at least one of the rollers 12 or 13 is driven, too.

FIG. 2 illustrates, furthermore, how the guiding unit 1 can be pivoted e.g. around the point P in order to provide the profile 2 with such an inclined position relative to the longitudinal axis of the cage that the profile 2 meets the driven cage rods 8 perpendicularly.

The gist of the present invention lies in the oblique position of these cage rods 8 and their drive in the direction of feed of the profile 2.

Because the profile 2 comes to lie on the driven cage rods at right angles the frictional forces come to act over the entire length of the line of contact and the profile or strip is transported optimally. This driving via the plurality of driven cage rods 5 is sufficient to bend the profile, to join the edges and to feed the pipe after leaving the winding apparatus into a recessed structure (a pipe to be repaired).

Due to the relative length of the cage rods (several times the width of the profile) the produced pipe is not only calibrated accurately, but additionally, due to its contacting the rods it is made to rotate and to be advanced.

The driven rods extending obliquely relative to the axis of the cage do not contact over their entire width the cylinder formed by the cage if they have a cylindric shape. In practice such is meaningless in case of narrow profile widths. This effect could, however, be equalized by the selection of a concave shape of the rods when viewed in the longitudinal section. Accordingly, it is possible to design the driven rods cylindric, concave or convex.

The rods consist generally of steel, having a smooth or rough surface (e.g. grooved). They may be equipped with a friction increasing coating (plastic material).

While there is shown and described a present preferred embodiment of the invention, it is to be distinctly understood that the invention is not limited thereto, but may be otherwise variously embodied and practiced within the scope of the following claims.

We claim:

1. An apparatus for the production of pipes by helically winding a strip of material, said apparatus comprising: a stationary winding cage including a plurality of rod shaped members arranged in a substantially cylindrical array having a longitudinal axis, the rod shaped members supported between two spaced, parallel annular supporting plates, wherein the rod shaped members are driven to rotate around their respective longitudinal axes in order to support a strip of material, guiding means adjacent the cage for guiding the strip of material onto an inner side of the cage to a desired diameter and for feeding the strip in the winding direction to bring together edges of the strip wherein the driven rod shaped members are positioned at an oblique angle relative to the cage longitudinal axis between said annular supporting plates, the oblique angle corresponding with a pitch angle of the strip to be wound helically, relative to the cage longitudinal axis, and wherein the guiding means positions the strip to be wound perpendicularly to the longitudinal axes of the driven rod shaped members.

2. The apparatus of claim 1, wherein said guiding means is pivotally mounted to the supporting plates of the winding cage to be angularly pivotable relative to the longitudinal axis of said cage to place the strip perpendicularly relative to the longitudinal axes of the rod-shaped members and arranged at an oblique angle and in contact therewith.

3. The apparatus of claim 1, including a web joining roller projecting into the inside of said cage at a point of entry of the strip into said cage at a strip joining zone, the joining roller contacting overlapping edges of the strip to join the overlapped strip edges.

4. The apparatus of claim 3, wherein said web joining roller has an axial length greater than the width of the strip being fed.

5. The apparatus of claim 4, including a counter supporting roller adjacent said web joining roller and located outwardly of the joining roller, relative to the cage longitudinal axis, to form together with said joining roller a joining gap for the strip edges to be joined together.

6. The apparatus of claim 5, wherein said counter supporting roller is defined by one of the rod shaped members of the cage.

7. The apparatus of claim 5, wherein at least one of said web joining roller and said counter supporting roller is driven in the running direction of the strip.

8. The apparatus of claim 1, wherein said cage additionally includes a plurality of fixed stationary rods that extend parallel to the longitudinal axis of the cage.

9. The apparatus of claim 1, wherein the obliquely positioned rod shaped members have a cylindrical shape.

10. The apparatus of claim 9, wherein the obliquely positioned rod shaped members have outer surfaces treated for gripping the strip of material to be bound.

11. The apparatus of claim 1, wherein said driven rods are steel.

12. The apparatus of claim 11, wherein said driven rods include a friction increasing coating.

13. The apparatus of claim 1, including driving means for pushing the strip into the cage until the strip contacts the cage rods.

* * * * *